United States Patent
Wissenburgh et al.

[11] Patent Number: 5,991,412
[45] Date of Patent: *Nov. 23, 1999

[54] METHOD FOR PROTECTEDLY DEBITING AN ELECTRONIC PAYMENT MEANS

[75] Inventors: Jelle Wissenburgh, The Hague; Johannes Brehler, Leidschendam; Frank Muller, Delft; Martin Klass De Lange, Voorburg; Hendricus Johannes Wilhelmus Maria Van de Pavert, Veenendaal; Albertus Feiken, Amstelveen, all of Netherlands

[73] Assignee: Koninklijke KPN N.V., Groningen, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,454

[22] Filed: Dec. 9, 1996

[30] Foreign Application Priority Data

Dec. 8, 1995 [NL] Netherlands .......................... 1001863

[51] Int. Cl.$^6$ .................................................. H04L 9/00
[52] U.S. Cl. ................................ 380/24; 380/23; 380/25; 235/379; 235/380; 705/16; 705/17; 705/35; 705/39; 705/41
[58] Field of Search .................................. 705/16, 17, 18, 705/26, 35, 39, 40, 41, 42, 43, 44; 380/23, 24, 25, 9, 49, 50, 59; 235/379, 380; 395/186, 187.01, 188.01

[56] References Cited

U.S. PATENT DOCUMENTS

| 4,910,393 | 3/1990 | Gercekci et al. ........................ 235/380 |
| 5,128,997 | 7/1992 | Pailles et al. . |
| 5,191,193 | 3/1993 | Leroux ..................................... 235/379 |
| 5,495,098 | 2/1996 | Pailles et al. . |

FOREIGN PATENT DOCUMENTS

| 0 223 213 B1 | 5/1987 | European Pat. Off. . |
| 0 409 701 A1 | 1/1991 | European Pat. Off. . |
| 0 570 924 A2 | 11/1993 | European Pat. Off. . |
| 0 621 570 A1 | 10/1994 | European Pat. Off. . |
| 0 637 004 A1 | 2/1995 | European Pat. Off. . |

*Primary Examiner*—Bernarr E. Gregory
*Attorney, Agent, or Firm*—Oblon, Spivak, McClelland, Maier & Neustadt, P.C.

[57] ABSTRACT

The invention relates to a method for protected transactions involving a so-called smart card and a terminal, such as a cash register. In order to prevent the smart card from simultaneously carrying out transactions with several terminals, the invention provides an authentication value which is used in the data exchange between the smart card and the terminal to uniquely identify subsequent steps of the transaction.

25 Claims, 3 Drawing Sheets

METHOD FOR PROTECTEDLY DEBITING AN ELECTRONIC PAYMENT MEANS

BACKGROUND OF THE INVENTION

The invention relates to a method for debiting an electronic payment means, such as an electronic payment card provided with an integrated circuit ("chip card"). In particular, though not exclusively, the invention relates to a method for protectedly debiting prepaid electronic payment cards ("prepaid cards") as these are applied, e.g., for telephone booths. In the present text, the term payment means will be used irrespective of the form or the type of the specific payment means. A payment means may therefore be formed by, e.g., a chargeable payment card or a non-card-shaped electronic payment means.

In recent years, electronic payment means are being applied ever more frequently, not only for paying for the use of public telephone sets, but also for many other payment purposes. Since such a payment means generally comprises a (credit) balance which represents a monetary value, it is necessary to have the exchange of data between such a payment means and a payment station (such as a telephone set designed for electronic payment or an electronic cash register) run according to a protected method (payment protocol). Here, it should be ensured, e.g., that an amount (monetary value or number of calculation units) debited to the payment means correspond to an amount (monetary value or calculation units) credited elsewhere: the amount paid by a customer should correspond to the amount to be received by a supplier. The credited amount may be stored, e.g., in a protected module present in the payment station.

Prior Art payment methods, as disclosed in e.g. European Patent Application EP 0,637,004 comprise: a first step, in which the balance of the payment means is retrieved by the payment station; a second step, in which the balance of the payment means is lowered (debiting the payment means); and a third step, in which the balance of the payment means is retrieved again. From the difference between the balances of the first and third steps the debited amount, and therewith the amount to be credited in the payment station, may be determined. The second step may be repeated several times, possibly in combination with the third step.

The above-mentioned European Patent Application EP 0,637,004 corresponds with U.S. patent application Ser. No. 08/703,824, filed Aug. 27, 1996, entitled "Method and Apparatus for Recording Usage Data of Card Operated Devices", which U.S. patent application is herewith incorporated by reference in this text.

In order to prevent fraud, in such a method the first step makes use of a random number which is generated by the payment station and transferred to the payment means, e.g., as part of a code with which the balance is retrieved. On the basis of said random number, the payment means as a first response generates an authentication code which may comprise an (e.g., cryptographic) processed form of, inter alia, the random number and the balance. By using a different random number for each transaction, it is prevented that a transaction may be imitated through replay. In addition, in the third step use is made of a second random number, which is also generated by the payment station and transferred to the payment means. On the basis of the second random number, the payment means as a second response generates a second, new authentication code which may comprise a processed form of, inter alia, the second random number and the new balance. On the basis of the difference of the two balances transferred, the payment station (or a protected module of the payment station, as the case may be) may determine with which amount the balance of the payment station should be credited.

The known method is basically very resistant to fraud as long as a payment means communicates with one payment station (or protected module). The drawback of the known method, however, lies in the fact that the first and second authentication codes are independent. If a second or third payment station (or protected module) communicates with the payment means, it is possible, due to said independence, to separate the first step from the second and third steps. As a result, an apparently complete transaction may be achieved without the payment means in question being debited by the same amount as the amount by which the payment stations (or protected modules) in their entirety are credited. It will be understood that such is undesirable.

U.S. Pat. No. 5,495,098 and corresponding European Patent Application EP 0,621,570 disclose a method in which the identity of the security module of the payment station is used to ensure that a data exchange takes place between the card and one terminal only. The protection of the data exchange between the security module, the station and the card is relatively complicated and requires extensive cryptographic calculations.

Other Prior Art methods are disclosed in e.g. European Patent Applications EP 0,223,213 and EP 0,570,924, but these documents do not offer a solution to the above-mentioned problems.

SUMMARY OF THE INVENTION

It is an object-of the invention to eliminate the above and other drawbacks of the Prior Art, and to provide a method which offers an even greater degree of protection of debiting transactions. In particular, it is an object of the invention to provide a method which ensures that during a transaction there only takes place communication between the payment means and one payment station or protected module. More in particular, it is an object of the invention to provide a method which ensures that the amount by which the balance of a payment means is lowered during a transaction, corresponds to the amount by which the balance of only one payment station or protected module is increased.

Accordingly, the present invention provides a method of performing a transaction using payment means and a payment station, the method comprising the repeated execution of an interrogation step in which the payment station interrogates the payment means and receives payment means data in response, the payment means data comprising an authentication code produced by a predetermined process, a subsequent authentication code being linked to a preceding authentication code of the same transaction by an authentication value produced in both the payment means and the payment station. By linking the authentication codes by authentication values, it is possible to distinguish authentication codes of the initial transaction from authentication codes of an interfering transaction. Preferably, the authentication value is altered in each interrogation step, thus providing an improved security.

More specifically, the present invention provides a method of protectedly debiting an electronic payment means using a payment station, the method comprising:
   a first step, in which:
      the payment station transfers a first random number to the payment means,
      the payment means, in response to said first random number, transfers a first authentication code to the payment station, which first authentication code is determined on the basis of at least the first random number and a first authentication value, and the payment station checks the first authentication code;

an optional second step, in which:

the payment station transfers a debiting command to the payment means and the balance of the payment means is lowered on the basis of the debiting command; and a third step, in which:

the payment station transfers a second random number to the payment means, the payment means, in response to said second random number, transfers a second authentication code to the payment station, with the second authentication code being determined on the basis of at least the second random number and a second authentication value, the second authentication value being derived from the first authentication value, and the payment station derives the second authentication value from the first authentication value and checks the second authentication code. By forming the authentication codes on the basis of, inter alia, mutually related authentication values, there is offered the possibility to check whether the second authentication code (in the third step) is related to the first authentication code (in the first step). By now generating a new authentication value each time an authentication code must be determined, there is offered the possibility of distinguishing consecutive authentication codes, and therewith to distinguish authentication codes associated with different transactions. If, each time the first or third step is carried out, there is generated a unique authentication value, it may be unequivocally determined which second authentication code is related to which first one. Therewith it may also be determined whether, within a transaction, a second authentication code has already been issued.

The authentication values are basically autonomously generated by the payment means. There preferably is not possible any influencing from outside, such in order to prevent fraud. The authentication values may be generated in various ways, e.g., by a random generator or by a counter.

The first and second authentication values of a transaction may be related by them having, e.g., the same value, or by them having mutually dependent values, such as consecutive values of a counter. Also, the first authentication value may be a random number, and the second authentication value may be formed from the first one by adding a certain number thereto. Basically, each pair of authentication values should be related in such a manner that this is capable of being unequivocally checked.

It is a further object of the invention to provide an electronic payment means and a payment station in which the method is applied.

BRIEF DESCRIPTION OF THE DRAWINGS

The invention will be explained in greater detail below by reference to the Figures.

DESCRIPTION OF PREFERRED EMBODIMENTS

Figure 1:
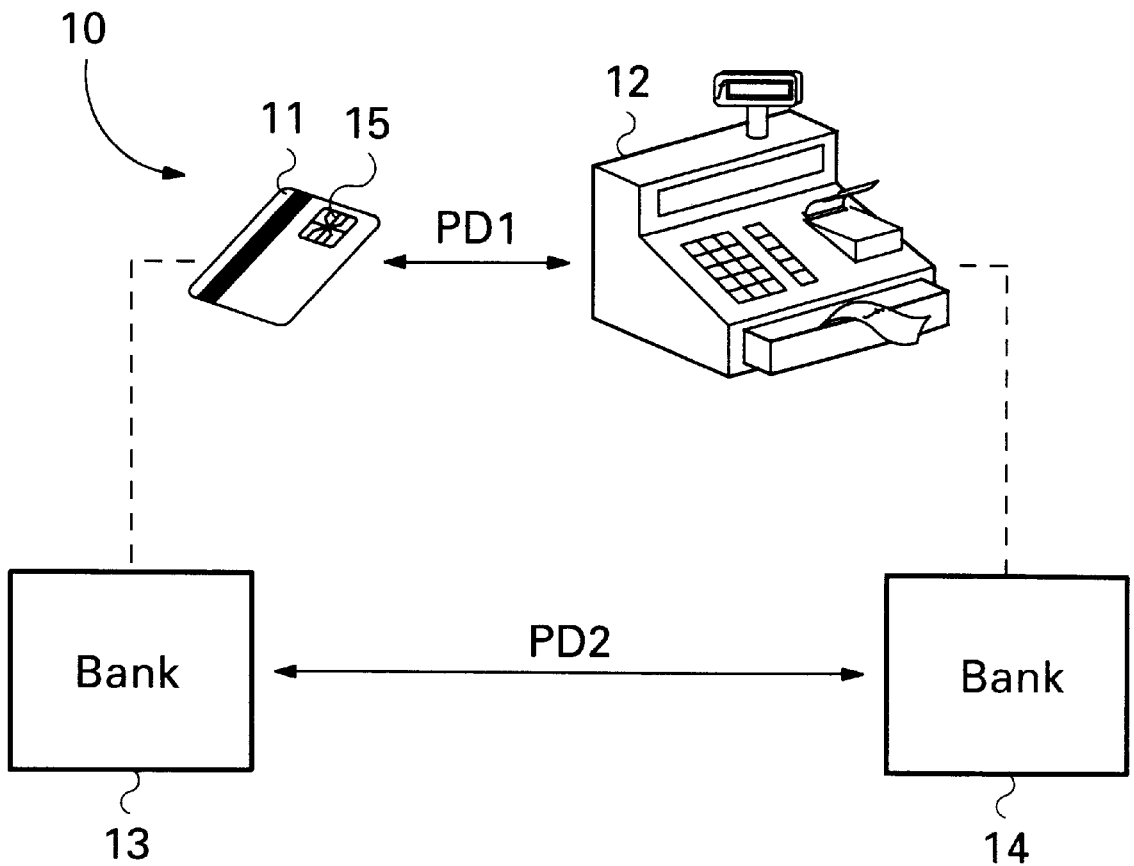
FIG. 1 schematically shows a payment system in which the invention may be applied.

The system 10 for electronic payment schematically shown in FIG. 1, by way of example comprises an electronic payment means, such as a so-called chip card or smart card 11, a payment station 12, a first payment institution 13, and a second payment institution 14. The payment station (terminal) 12 is shown in FIG. 1 as a cash register, but may also comprise, e.g., a (public) telephone set. The payment institutions 13 and 14, both denoted as bank in FIG. 1, may not only be banks but also further institutions having at their disposal means (computers) for settling payments. In practice, the payment institutions 13 and 14 may form one payment institution. In the example shown, the payment means 11 comprises a substrate and an integrated circuit having contacts 15, which circuit is designed for processing (payment) transactions. The payment means may also comprise an electronic wallet.

Between the payment means 11 and the payment station 12 there takes place, during a transaction, an exchange of payment data PD1. The payment means 11 is associated with the payment institution 13, while the payment station 12 is associated with the payment institution 14. Between the payment institutions 13 and 14 there takes place, after a transaction, a settlement by exchanging payment data PD2, which is derived from the payment data PD1. During a transaction there basically does not take place communication between the payment station 12 and the payment institution 14 in question (so-called offline system). Transactions must therefore occur under controlled conditions to ensure that there can take place no abuse of the system. Such an abuse may be, e.g., increasing a balance of the payment means 11 which is not matched by a balance change of a counterpart account at the payment institution 13.

Figure 2:
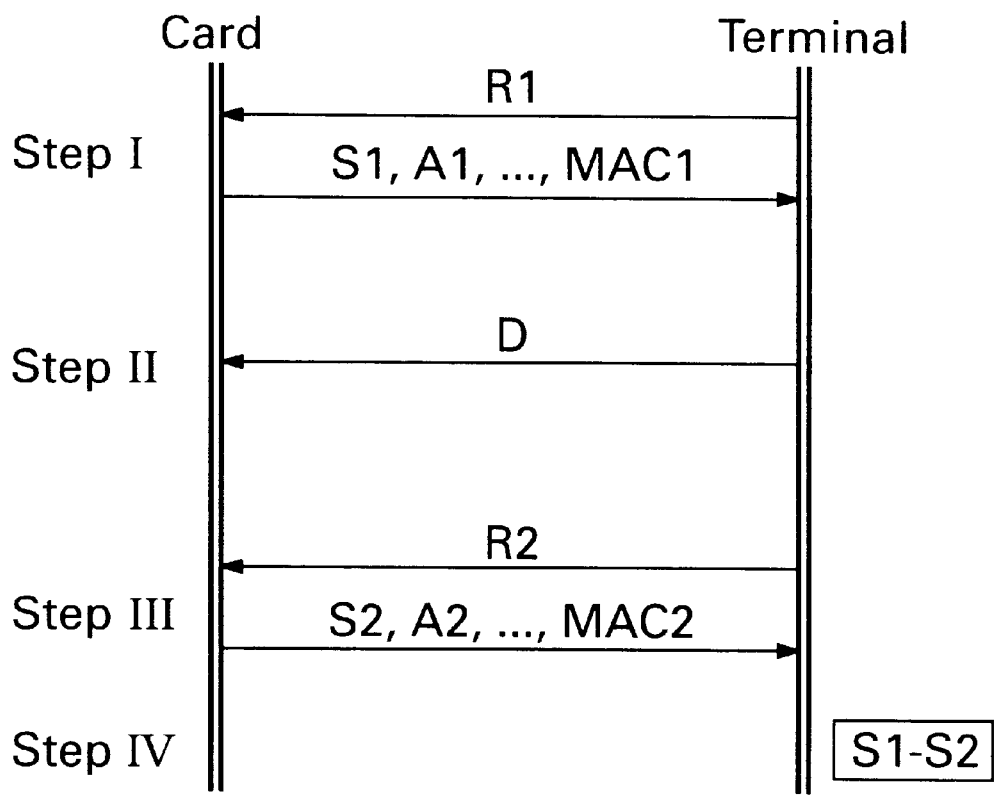
FIG. 2 schematically shows a method in which the invention is applied.

The diagram of FIG. 2 shows the exchange of data between (the integrated circuit of) a payment means denoted as "Card" (11 in FIG. 1) and (the protected module of) a payment station denoted as "Terminal" (12 in FIG. 1), with consecutive occurrences being shown one below the other.

In the first step, denoted by I, the terminal (payment station) produces a first random number R1 and transfers this number to the card (payment means) (substep Ia). In practice, the random number R1 may be part of a code for retrieving an authentication code. According to the invention, the card and the terminal produce a first authentication value A1, e.g., by increasing a counter, activating a random number generator, or both. On the basis of the random number R1, the first authentication value A1 and other data, including the balance S1 of the payment means, the card produces an authentication code MAC1=F(R1, A1, S1, . . . ), where F may be a cryptographic function known per se (substep Ib). The card data S1 and A1 as well as the authentication code MAC1 are transferred to the terminal (substep Ic). The terminal checks the authentication code on the basis of, inter alia, R1, S1 and A1 and, in the event of a positive check result, records the balance S1.

It should be noted that the transfer of the value A1 to the terminal is not essential to the present invention but serves to provide additional protection against fraud.

In the second step, denoted by II, the terminal produces a debiting command D, which comprises the amount (quantity) to be debited to the payment means. The debiting command D is transferred to the card, whereafter the balance S1 of the payment means is lowered by the quantity to be debited to S2. The second step may possibly be repeated several times.

In the third step, denoted by III, the terminal produces a second random number R2 and transfers this to the card (substep IIIa). The card generates a second authentication value A2. On the basis of the second random number R2, the second authentication value A2 and other data, including the new card balance S2, the card produces an authentication code MAC2=F(R2, A2, S2, . . . ), where F may be a cryptographic function known per se (substep IIIb). The card balance S2 and the authentication value A2 as well as the authentication code MAC1 are transferred to the terminal (substep IIIc). The third step may thus run fully analogously to the first step.

The terminal checks the second authentication code MAC2 received, e.g., by reproducing the authentication code and comparing the random number R2. The terminal also checks whether the received second authentication value A2 is equal to the corresponding value produced in the terminal. If the authentication values A2 are not equal, the transaction is terminated and the balance of the terminal is therefore not modified.

If the check of the authentication code MAC2 has a positive result, the terminal records the balance S2. Instead of reproducing the authentication codes MAC1 and MAC2, a deciphering may take place, e.g., by carrying out the inverse of the function F.

In a fourth step, denoted by IV, the difference of the balances S1 and S2 may be determined and recorded in the terminal. In this connection, such difference may either be stored separately or be added to an existing value (balance of the terminal) to be settled later. The fourth step, just as possible following steps, is not essential for the invention. The steps shown in FIG. 2 may be preceded by an authentication or verification step; such, however, is not essential for the present invention either.

In the diagram, which has been discussed above, the random numbers R1 and R2 are different. The random numbers R1 and R2 may be identical (R1=R2=R), however, so that in step III it may also be checked whether in the authentication code MAC2 use is still being made of the same random number R (=R1).

It should be noted that strictly speaking the number R1, just as the number R2, need not be a random number: it serves for the unequivocal identification of the authentication code MAC1 as response to R1 ("challenge"). It is essential only that R1 be not recognisable to the card.

According to Prior Art methods, the authentication codes MAC1 and MAC2 are basically independent. This is to say that, if the random numbers R1 and R2 differ, there is no direct or indirect relationship between the codes MAC1 and MAC2. Due to this independence, there is basically no guarantee that the steps I and III are carried out between the same card and the same terminal.

According to the invention, however, when determining the second authentication code there is assumed an authentication value which is directly related to the authentication value used when determining the first authentication code. As a result, a relationship is established between the two authentication codes of the transaction in question. This relationship is preferably straightforward (e.g. A2=A1+1) allowing a simple check.

If, e.g., the card receives a (first) random number R1' from a second terminal after the card has output a first authentication code MAC1 to a first terminal, the card will output an authentication code MAC2. If thereupon the first terminal, after outputting a debiting command, once again retrieves an authentication code, the card outputs a further authentication code MAC3 which is based, inter alia, on the further authentication value A3. The terminal will observe that the authentication codes MAC1 and MAC3 are not related, and will not be capable of using the balance value S3 which was included in the authentication code MAC3. Similarly, an authentication MAC4, which is retrieved by the second terminal, provides no valid authentication and therefore no valid balance value. In this manner, the transfer of modified balance values to several terminals is effectively prevented.

The authentication values are preferably formed by consecutive numbers, e.g., counter positions. It is also possible, however, to use a counter which is increased every other time (second time of generating an authentication value), so that each time two consecutive authentication values will be equal. It should be noted that the payment means may distinguish between the first and the third steps, but need not do so.

The dependence of the authentication values in accordance with the invention ensures that all steps of the transaction in which the method according to the invention is applied, take place between the same payment means and the same terminal.

Figure 3:
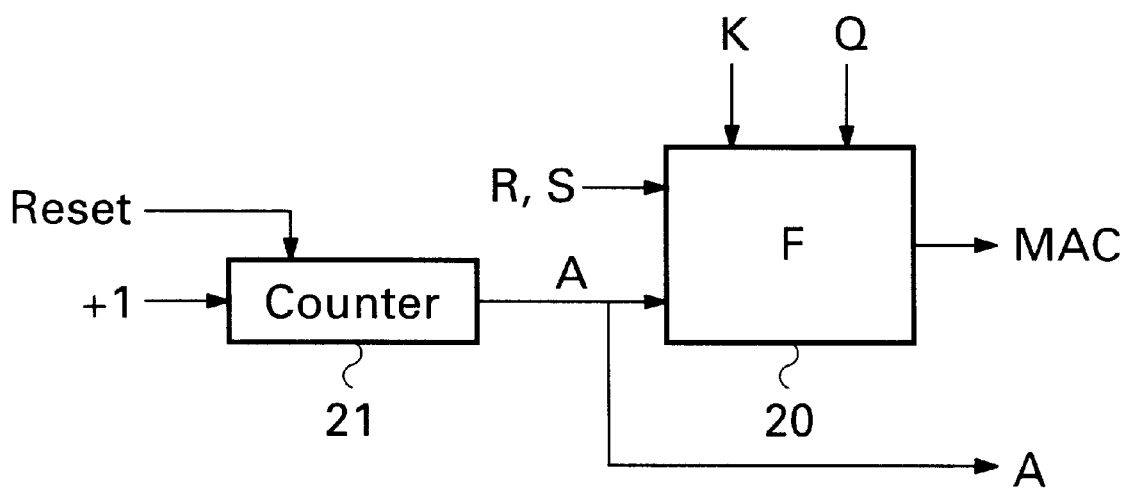
FIG. 3 schematically shows the producing of an authentication code as used in the method of FIG. 2.

FIG. 3 schematically shows how an authentication code MAC ("Message Authentication Code"), such as MAC1 and MAC2 of FIG. 2, may be produced. Several parameters are input into a processing means 20 embodying a function denoted as "F". This function F may be a cryptographical function (such as e.g. the well-known DES function) or a so-called "hash" function, both of which are well known in the art. Alternatively, the function F is a relatively simple combinatorial function, in which case the processing means 20 may comprise a shift register with selective feedback. The parameters input into the processing means 20 and thus into the function F are in the example of FIG. 3: a random value R, a card balance S, an authentication value A, a key K and an initialization vector (start value) Q. The random value R corresponds with e.g. the values R1 and R2 transmitted to the card in step I and step III respectively. The card balance S corresponds with e.g. the balances S1 and S2 stored in the card. The key K may be a (secret) key which preferably is unique for a specific card or batch of cards. A key identifier may be exchanged with the terminal in an authentication or verification step prior to step I of FIG. 2.

The initialization vector Q, which initializes the process F, may always have a fixed value, e.g. zero. Alternatively, the vector Q depends on the residue (final state) of the function F after the previous step of the transaction. Preferably, the vector Q is reset when a new transaction is started.

The authentication value A is in the example shown generated by a counter 21. The counter is preferably increased at each interrogation step (e.g. step I and step III), i.e. at each step in which an authentication code (MAC) is produced in response to a random number (R). This results in a different authentication value A being used for each authentication code. As the increment (in this case +1, but +2 or +10 are also possible) is predetermined, the terminal is able to verify the authentication code. Preferably, the authentication value is also transmitted to and verified by the terminal. The counter 21 is reset when a new transaction is started.

In the example of FIG. 3, the authentication value A is produced by a counter. Alternatively, the counter 21 is replaced by a random number generator, which generates a new authentication value A for each interrogation step (e.g. steps I and III) of the transaction. In this case, the authentication value of the previous step should be used as initialization vector ("seed") of the random number generator in order to preserve the mutual dependence and reproducibility of the authentication values.

It will be understood that the scheme of FIG. 3 applies to both the card and the terminal. The terminal thus also produces authentication values A1, A2, . . . and authentication codes MAC1, MAC2, . . . and compares these with the corresponding authentication codes and values received from the card. A balance (e.g. S2) will only be accepted by the terminal if the produced and received authentication codes and values are equal.

Figure 4:
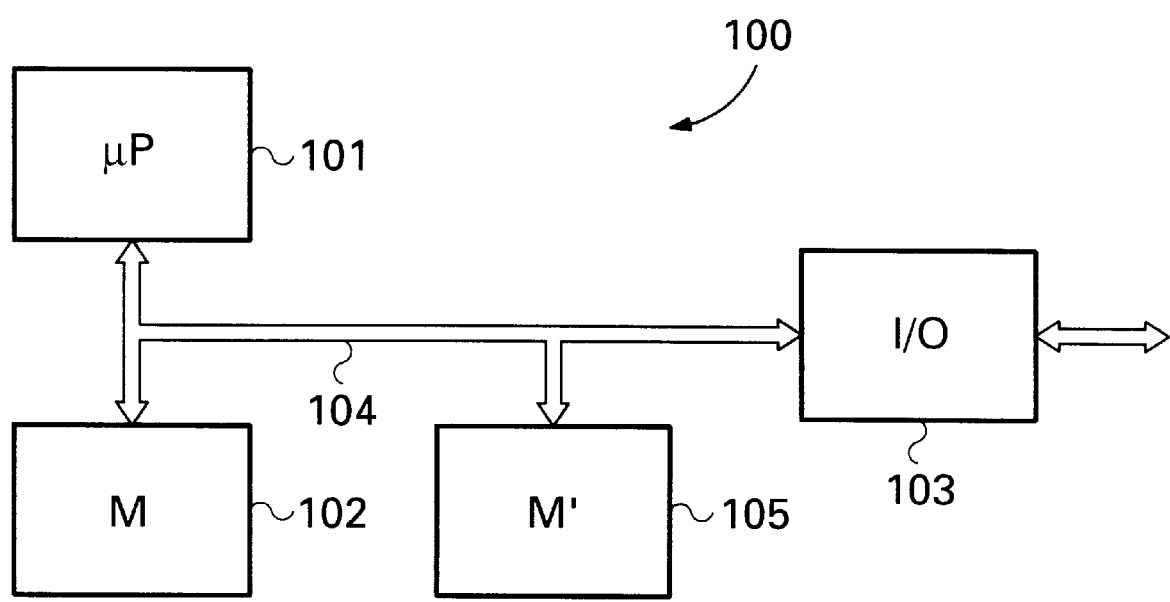
FIG. 4 schematically shows the integrated circuit of a payment means with which the invention may be applied.

On the basis of FIG. 4, it will be further explained how the method according to the invention may be applied to payment cards.

The diagram of FIG. 4 shows a circuit 100 having a control unit 101, a memory 102, and an input/output unit 103, which are mutually coupled. The control unit may be formed, e.g., by a microprocessor or a microcontroller. The memory 102 may comprise a RAM and/or ROM memory. The memory 102 preferably comprises a rewritable ROM memory (EEPROM).

According to the invention, the circuit 100 also comprises a supplementary memory 105 for storing authentication values. As shown in FIG. 4, the memory 105 may form a separate unit, but may also be part of the memory 102 and, e.g., be formed by a few memory positions of the memory 102. The memory 105 is preferably formed by a counter circuit. Alternatively, a separate counter circuit as shown in FIG. 3 may be used.

In a preferred embodiment, consecutive authentication values are formed by consecutive counter positions. A first authentication value A1, which is used to form the authentication code MAC1, corresponds to a position of the counter, as stored in the memory 105. After the second step (see also FIG. 2), the counter position is increased by one. The initial counter position may be basically random, but may also be reset to a predetermined value. e.g. zero.

Generating authentication values occurs autonomously, i.e., without (possible) influencing from outside. As a result, the resistance to fraud is further increased.

It will be understood that, instead of each time increasing the counter position by one, it may each time be decreased by one. Likewise, the counter position may each time be increased or decreased by more than one, e.g., by two or four. It is also possible to construct the circuit 100 in such a manner that the authentication value(s) are not modified within a transaction but only between transactions. In such a case, the payment station is of course arranged accordingly.

A payment station for the application of the invention comprises means (such as a card reader) for communicating with a payment means, means for carrying out authentications (such as a processor), and means for recording balance values (such as a semiconductor memory). The payment station is constructed in such a manner that an unsuccessful authentication makes it impossible for a new balance value to be recorded. The authentication according to the invention also comprises the authentication values. The steps of the method according to the invention may be laid down both in equipment (specific circuit, such as an ASIC) and in software (suitable program for a processor).

It will be understood by those skilled in the art that the invention is not limited to the embodiments shown, and that many modifications and amendments are possible without departing from the scope of the invention. Thus, the principle of the invention is described above on the basis of debiting a payment means, but said principle may also be applied to crediting payment means.

We claim:

1. A method of performing a transaction between an electronic payment mechanism and a payment station, comprising:

requesting, by said payment station, payment data from said payment mechanism;

generating a plurality of authentication codes in which each authentication code of said plurality of authentication codes is linked by an authentication value to a preceding authentication code in a same transaction between said payment mechanism and said payment station;

transmitting, by said payment mechanism, said requested payment data including a respective authentication code of said plurality of authentication codes to said payment station; and determining, by said payment station, whether said respective authentication code is linked to a respective preceding authentication code.

2. The method according to claim 1, wherein said step of generating said plurality of authentication codes generates at least one authentication code using an authentication value derived from a previous authentication value.

3. The method according to claim 1, wherein said step of generating said plurality of authentication codes generates at least one authentication code using a key.

4. The method according to claim 1, wherein said step of generating said plurality of authentication codes generates at least one authentication code using a random value.

5. The method according to claim 1, wherein said step of generating alters said authentication value after each transaction.

6. A method of performing a transaction between an electronic payment mechanism and a payment station, comprising:

transferring, by said payment station, a first random value to said payment mechanism;

determining, by said payment mechanism, a first authentication code using at least the first random value and a first authentication value;

transferring, by said payment mechanism in response to said first random value transferred by said payment station, said first authentication code to said payment station;

checking, by said payment station, said first authentication code;

transferring, by said payment station, a second random value to said payment mechanism;

determining, by said payment mechanism, a second authentication code using at least the second random value and a second authentication value derived from said first authentication value;

transferring, by said payment mechanism in response to said second random value transferred by said payment station, said second authentication code to said payment station; and determining, by said payment station, whether said second authentication code is linked to said first authentication code.

7. The method according to claim 6, wherein said step of determining whether said second authentication code is linked to said first authentication code comprises:

determining, by said payment station, a third authentication value derived from the first authentication value; and comparing the third authentication value to the second authentication value.

8. The method according to claim 6, wherein said step of determining whether said second authentication code is linked to said first authentication code comprises:

determining, by said payment station, a third authentication code based on said second authentication value and said second random value; and comparing the third authentication code to the second authentication code.

9. The method according to claim 6, wherein in said step of determining said second authentication code, said second authentication value is identical to said first authentication value.

10. The method according to claim 6, wherein in said step of determining said second authentication code, said first authentication value and said second authentication value comprise consecutive counter values.

11. The method according to claim 6, wherein in said step of determining said second authentication code, said second authentication value is based on said second random number and said first authentication value.

12. The method according to claim 6, further comprising:

transferring, by said payment station, a command to said payment mechanism; and changing a balance of said payment mechanism using said command.

13. The method according to claim 12, wherein said command is a debiting command and said step changing reduces said balance of payment mechanism using said debiting command.

14. The method according to claim 6, further comprising:

setting said second random value to be identical to said first random value before transferring said second random value.

15. The method according to claim 6, further comprising:

determining at least one of said first authentication code and said second authentication code using a key and an identification code.

16. The method according to claim 6, further comprising:

determining at least one of said first authentication code and said second authentication code using a cryptographic function.

17. The method according to claim 6, further comprising:

transferring, by the payment mechanism, a balance of said payment mechanism to said payment station.

18. The method according to claim 6, wherein in said steps of transferring, by said payment mechanism, said first authentication code and said second authentication code, said first authentication value and said second authentication value are current authentication values.

19. The method according to claim 6, wherein said steps of transferring the second random value, determining the second authentication code, transferring the second authentication code, and determining whether the second authentication code is linked, are repeatedly performed.

20. The method according to claim 6, further comprising:

recording processed data in a memory of said payment station.

21. The method according to claim 6, comprising:

recording, by the payment station, a difference between a current balance and a preceding balance transferred by said payment mechanism.

22. A smart card, comprising:

an input/output circuit which inputs/outputs data from/to a payment station;

a memory which stores counter values;

a control unit which controls an operation of said smart card, including said input/output circuit and said memory; and a data bus connecting said input/output circuit, said memory and said control unit, wherein said control unit is configured to produce authentication codes linked to preceding authentication codes using said counter values, for authenticating data output to said payment station.

23. The smart card according to claim 22, wherein said control unit comprises an integrated circuit.

24. The smart card according to claim 22, wherein said memory comprises a first memory and a second memory, and said counter values are stored in one of said first memory and said second memory.

25. The smart card according to claim 22, wherein said control unit resets said counter values stored in said memory upon an initiation of a new transaction between said smart card and said payment station.

* * * * *

UNITED STATES PATENT AND TRADEMARK OFFICE
CERTIFICATE OF CORRECTION

PATENT NO. : 5,991,412
DATED : November 23, 1999
INVENTOR(S) : Wissenburgh et al.

It is certified that error appears in the above-identified patent and that said Letters Patent is hereby corrected as shown below:

Column 3,
Line 23, after "code." begin a new paragraph.

Signed and Sealed this

Twenty-fifth Day of December, 2001

Attest:

Attesting Officer

JAMES E. ROGAN
Director of the United States Patent and Trademark Office